(12) United States Patent
Kang et al.

(10) Patent No.: US 10,567,033 B2
(45) Date of Patent: Feb. 18, 2020

(54) METHOD AND APPARATUS FOR DETECTING RANDOM ACCESS AND MULTIUSER USING MULTIPLE SEQUENCE SPREADING

(71) Applicant: KOREA UNIVERSITY RESEARCH AND BUSINESS FOUNDATION, Seoul (KR)

(72) Inventors: Chung Gu Kang, Seoul (KR); Ameha Tsegaye Abebe, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/768,712

(22) PCT Filed: Jan. 13, 2016

(86) PCT No.: PCT/KR2016/000358
§ 371 (c)(1),
(2) Date: Aug. 21, 2018

(87) PCT Pub. No.: WO2017/065355
PCT Pub. Date: Apr. 20, 2017

(65) Prior Publication Data
US 2018/0351600 A1    Dec. 6, 2018

(30) Foreign Application Priority Data

Oct. 16, 2015    (KR) .......................... 10-2015-0144563

(51) Int. Cl.
*H04B 1/69*     (2011.01)
*H04W 72/04*    (2009.01)
(Continued)

(52) U.S. Cl.
CPC .............. *H04B 1/69* (2013.01); *H04W 72/04* (2013.01); *H04W 74/0833* (2013.01); *H04W 88/02* (2013.01)

(58) Field of Classification Search
CPC .... H04B 1/69; H04W 88/02; H04W 74/0833; H04W 72/04
See application file for complete search history.

(56) References Cited

U.S. PATENT DOCUMENTS 5,581,547 A * 12/1996 Umeda .................. H04B 1/707
                                          370/342
6,934,317 B1 * 8/2005 Dent ..................... H04L 1/0003
                                          375/140
(Continued)

FOREIGN PATENT DOCUMENTS

KR    10-1229690 B1    2/2013
WO    WO 2010/050712 A2    5/2010
(Continued)

OTHER PUBLICATIONS

International Search Report dated Jul. 11, 2016 for International Application No. PCT/KR2016/000358 (8 pages in English, 4 pages in Korean).

*Primary Examiner* — Rasheed Gidado
(74) *Attorney, Agent, or Firm* — NSIP Law (57) ABSTRACT

Disclosed are a method and an apparatus for detecting real-time random access and multi-user using multiple sequence spreading. The method for detecting real-time random access and multi-user using multiple sequence spreading may include steps of selecting, by user equipment, one spreading sequence set from a plurality of spreading sequence sets randomly without a separate resource allocation and/or spreading sequence allocation, applying, by the user equipment, each of the plurality of spreading sequences included in the one spreading sequence set to each of the (Continued)

plurality of symbols included in a group, and transmitting, by the user equipment, each of the plurality of symbols spread based on each of the plurality of spreading sequences.

2 Claims, 8 Drawing Sheets

(51) Int. Cl.
*H04W 74/08* (2009.01)
*H04W 88/02* (2009.01)

(56) References Cited

U.S. PATENT DOCUMENTS

| | | | |
|---|---|---|---|
| 8,660,094 B2 | 2/2014 | Han et al. | |
| 10,034,303 B2* | 7/2018 | Kishiyama | H04W 74/006 |
| 2006/0215738 A1* | 9/2006 | Kokkonen | H04B 1/7117 |
| | | | 375/148 |
| 2011/0317671 A1* | 12/2011 | Walton | H04B 1/692 |
| | | | 370/336 |
| 2015/0289163 A1* | 10/2015 | Mineta | H04B 1/707 |
| | | | 370/320 |

FOREIGN PATENT DOCUMENTS

| | | |
|---|---|---|
| WO | WO 2012/124980 A2 | 9/2012 |
| WO | WO 2014/178663 A1 | 11/2014 |
| WO | WO 2015/065045 A1 | 5/2015 |

* cited by examiner

METHOD AND APPARATUS FOR DETECTING RANDOM ACCESS AND MULTIUSER USING MULTIPLE SEQUENCE SPREADING

CROSS REFERENCE TO RELATED APPLICATIONS

This application is a National Stage Application of International Application No. PCT/KR2016/000358, filed on Jan. 13, 2016, which claims the benefit under 35 USC 119 (a) & 365 (b) of Korean Patent Application No. 10-2015-0144563 filed Oct. 16, 2015, in the Korean Intellectual Property Office.

BACKGROUND OF THE INVENTION

Field of the Invention

The present invention relates to communication method and apparatus in a mobile communication network and more particularly, to a method and an apparatus for detecting real-time random access and multi-user using multiple sequence spreading.

Description of the Related Art

A transmission scheme of an internet of things (IoT) apparatus is as follows in a conventional mobile communication network. Although machine type communication (MTC) devices have a large difference depending on an IoT application field, but mainly generate traffic in an uplink and may perform periodic or intermittent transmission. In this case, the size of a message transmitted by the MTC device in the MTC-based communication is relatively small, the mobility of the MTC device is absent or small, and the number of the MTC devices is very large. In addition, the MTC device has a very different characteristic from a human type communication (HTC) device, which requires very low cost and low power consumption, and a radio access scheme suitable for these properties is required.

In order to effectively support an IoT service, MTC traffic generated intermittently sporadically by a packet having a small length needs to be efficiently transmitted. In addition, an application service having a real-time restriction needs to be able to satisfy a delay requirement by immediately transmitting a data packet without a separate channel allocation procedure. The current 3rd generation partnership project (3GPP) long term evolution (LTE) standard has a form suitable for HTC in which a small number of users transmit a large amount of data by receiving transmission resources through a separate reservation procedure. However, in the MTC, a large number of devices transmit very small-sized packets. In this case, problems caused by the limitation of the number of devices that can be accessed at the same time, and delays and resource waste through complicated random access procedures for reserving resources may occur.

PRIOR ART DOCUMENT

Patent Document (Patent Document 1) Korean Patent Registration No. 10-1229690

SUMMARY OF THE INVENTION

An object of the present invention is to provide a method for detecting real-time random access and multi-user using multiple sequence spreading.

Another object of the present invention is to provide an apparatus for detecting real-time random access and multi-user using multiple sequence spreading.

An aspect of the present invention provides a method for detecting real-time random access and multi-user using multiple sequence spreading including: steps of selecting, by user equipment, one spreading sequence set from a plurality of spreading sequence sets randomly without a separate resource allocation and/or spreading sequence allocation; applying, by the user equipment, each of the plurality of spreading sequences included in the one spreading sequence set to each of the plurality of symbols included in a group; and transmitting, by the user equipment, each of the plurality of symbols spread based on each of the plurality of spreading sequences.

Meanwhile, the base station receives the plurality of spread symbols, and the plurality of spread symbols received from the base station is expressed by Equation below, $$y_i = A \odot x_i + w_i \quad \text{[Equation]}$$

here, $y_i$ represents the plurality of spread symbols received from the base station, A represents a channel matrix, $x_i$ represents the plurality of spread symbols, $\omega_i$ represents a noise vector, and $\odot$ is an operation of $(a+b)\odot(c+d)=ac+bd$.

the channel matrix is determined based on a spreading matrix based on each of the plurality of spreading sequences below, $$S^{(n)} = \begin{pmatrix} s_1^{(n)} & 0 & \cdots & 0 \\ 0 & s_2^{(n)} & \cdots & 0 \\ \vdots & \vdots & \ddots & \vdots \\ 0 & 0 & \cdots & s_v^{(n)} \end{pmatrix}$$

here, $s_I^{(n)}$ represents the I-th spreading sequence included in the n-th spreading sequence set and $s_1^{(n)} \neq s_2^{(n)} \neq \ldots \neq s_I^{(n)} \neq \ldots \neq s_v^{(n)}$, the group is generated by grouping a plurality of symbols included in a data symbol sequence into v unit symbols, and one spreading sequence set of a plurality of spreading sequence sets to be applied by a unit of the group is determined.

Another aspect of the present invention provides an apparatus for detecting real-time random access and multi-user using multiple sequence spreading including: a radio frequency (RF) unit transmitting and receiving a wireless signal; and a processor operatively coupled with the RF unit, in which the processor may be implemented to select one spreading sequence set from a plurality of spreading sequence sets randomly without a separate resource allocation and/or spreading sequence allocation, apply each of the plurality of spreading sequences included in the one spreading sequence set to each of the plurality of symbols included in a group, and transmit each of the plurality of symbols spread based on each of the plurality of spreading sequences.

Meanwhile, the base station receives the plurality of spread symbols, and the plurality of spread symbols received from the base station is expressed by Equation below, $$y_i = A \odot x_i + w_i \quad \text{[Equation]}$$

here, $y_i$ represents the plurality of spread symbols received from the base station, A represents a channel matrix, $x_i$ represents the plurality of spread symbols, $\omega_i$ represents a noise vector, and ⊙ is an operation of (a+b)⊙(c+d)=ac+bd.

the channel matrix is determined based on a spreading matrix based on each of the plurality of spreading sequences below, $$S^{(n)} = \begin{pmatrix} s_1^{(n)} & 0 & \cdots & 0 \\ 0 & s_2^{(n)} & \cdots & 0 \\ \vdots & \vdots & \ddots & \vdots \\ 0 & 0 & \cdots & s_v^{(n)} \end{pmatrix}$$

here, $s_I^{(n)}$ represents the I-th spreading sequence included in the n-th spreading sequence set and $s_1^{(n)} \neq s_2^{(n)} \neq \ldots \neq s_I^{(n)} \neq \ldots \neq s_v^{(n)}$, the group is generated by grouping a plurality of symbols included in a data symbol sequence into v unit symbols, and one spreading sequence set of a plurality of spreading sequence sets to be applied by a unit of the group is determined.

In the method and the apparatus for detecting real-time random access and multi-user using multiple sequence spreading according to the exemplary embodiment of the present invention, there is disclosed a transmission and reception structure capable of efficiently detecting user symbols even if the number of devices to be simultaneously accessed is very large (for example, K>1,000). Therefore, the random access capacity that can be implemented with the same radio resource may be increased.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The present invention will be described below in detail with reference to the accompanying drawings illustrating specific exemplary embodiments in which the present invention can be implemented as examples. These exemplary embodiments will be sufficiently described in detail enough to implement the present invention by those skilled in the art. It should be understood that various exemplary embodiments of the present invention are different from each other, but need not to be mutually exclusive. For example, a specific figure, a structure, and a characteristic described herein may be implemented as another exemplary embodiment without departing from the spirit and the scope of the present invention in relation to an exemplary embodiment. Further, it should be understood that a position or a displacement of an individual constituent element in each disclosed embodiment may be changed without departing from the spirit and the scope of the present invention. Accordingly, a detailed description below is not taken as a limited meaning, and is defined by the accompanying claims together with all equivalent scopes to the claims if the scope of the present invention is appropriately described. Like reference numerals in the drawing denote the same or similar function throughout several aspects.

Hereinafter, preferred exemplary embodiments of the present invention will be described in more detail with reference to the accompanying drawings.

Figure 1:
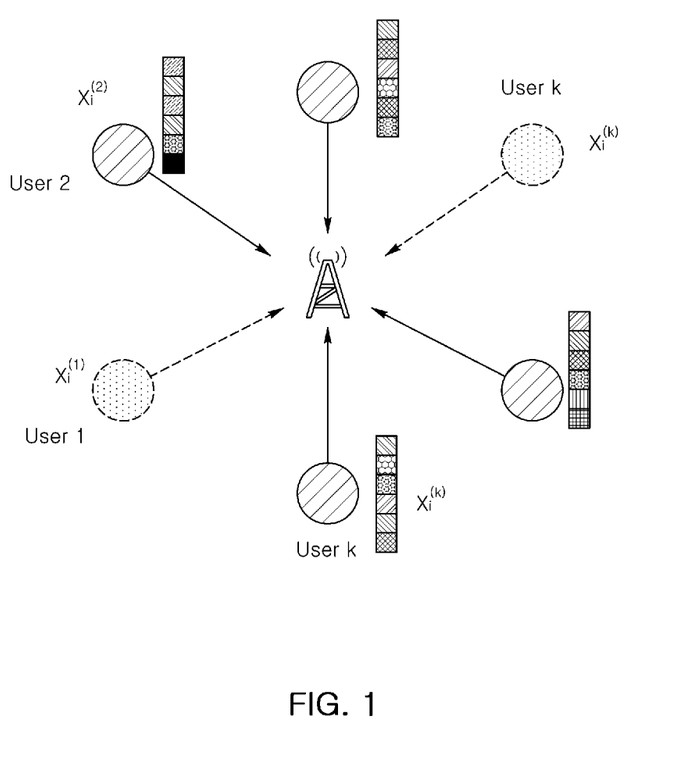
FIG. 1 is schematic diagram illustrating a random access technique of a code division multiple access (CDMA) scheme.

FIG. 1 is schematic diagram illustrating a random access technique of a code division multiple access (CDMA) scheme.

Referring to FIG. 1, when K user equipments simultaneously transmits uplink data through an uplink, user data may be spread and transmitted using a unique spreading sequence predetermined for each user equipment. At this time, the spreading sequence may refer to a vector having a length of M bits, and the spreading sequence allocated to the user equipment k may be represented by $s^{(k)}$. Accordingly, at this time, if each user equipment undergoes L multipaths, a channel for each user equipment may be represented by a matrix as shown in the following Equation 1.

$$H_k = \begin{bmatrix} h_{k,0} & 0 & \cdots \\ h_{k,1} & h_{k,0} & \\ \vdots & \vdots & \ddots \\ h_{k,L-1} & h_{k,L-2} & \\ 0 & h_{k,L-1} & \\ \vdots & \vdots & \ddots \\ 0 & 0 & \end{bmatrix} = circ(h_k) \in \Re^{M \times M} \quad [\text{Equation 1}]$$

Here, $h_k=[h_{k,1}, h_{k,2}, \ldots, h_{k,L}, 0, \ldots, 0]^T \in R^{M \times 1}$, and $circ(h_k)$ means that the above matrix is constituted by shifting the vector $h_k$ by one cycle per column. The i-th symbol transmitted by the k-th user equipment is expressed by $x_{i,k}$ ($xk \in 1, -1 \cup 0$) and defined as $x_i=(x_{i,1}, x_{i,2}, \ldots, x_{i,k})^T$. Assuming that a vector is received on the same time in a symbol unit by synchronization, a reception vector for the i-th symbol may be expressed by Equation 2 below.

$$y_i = \begin{bmatrix} y_{i,1} \\ y_{i,2} \\ \vdots \\ y_{i,M} \end{bmatrix} = \sum_{k=1}^{K} H_k s^{(k)} x_{i,k} = \qquad \text{[Equation 2]}$$

$$\underbrace{[H_1 \ H_2 \ \cdots \ H_K]}_{H} \underbrace{\begin{bmatrix} s^{(1)} & 0 & \cdots & 0 \\ 0 & s^{(2)} & \cdots & 0 \\ \vdots & \vdots & \ddots & \vdots \\ 0 & 0 & \cdots & s^{(K)} \end{bmatrix}}_{S} \underbrace{\begin{bmatrix} x_{i,1} \\ x_{i,2} \\ \vdots \\ x_{i,K} \end{bmatrix}}_{x_i} = Ax_i$$

By performing de-spreading using the spreading sequence $s^{(k)}$ of each user equipment for the received vector, a transmission symbol vector $x_i$ (i.e., $x_i = A^{-1} y_i$) of the user equipment may be detected.

In a system model based on Equation 2, if K>M, the system model becomes an overloaded CDMA system. Thus, performance degradation due to non-orthogonality between spreading sequences of the user equipments occurs. If each user equipment transmits a signal intermittently (i.e., all user equipment does not transmit the signal at the same time), the detection of the user equipment and the symbol detection are simultaneously performed through multi-user detection method of a compressed sensing concept, thereby improving symbol detection performance.

The multi-user detection method by compressed sensing is as follows.

If elements constituting the n-dimensional vector $x = (x_1, x_2, \ldots, x_n)^T \in R^n$ are almost all 0 (i.e., $\|x\|_0 \ll n$), this vector is called a sparse vector. The $\|x\|_0$ represents $l_0$-norm of x, which may be defined as the number of elements of which the values are not zero among the elements of x.

In addition, if the number of components that are not $x_i = 0$ is k or less (i.e., $\|x\|_0 \leq k$) with respect to $x = (x_1, x_2, \ldots, x_n)^T \in R^n$, $x \in R^n$ may be k-sparse. The compressed sensing is a concept of restoring an original signal vector through linear transformation having a dimension smaller than the dimension of the vector with respect to a finite-dimensional sparse signal vector. That is, it can be meant that even if the number of samples is smaller than that of a Nyquist sampling rate based on the compressed sensing, the restoration is possible.

In mathematical terms, it is a technique that may calculate a unique solution under the constraint that the signal is sparse even when the number of equations is smaller than the number of variables. Then sample values (measurement vectors) may be measured as follows based on the following Equation 3 by applying a sensing matrix $\Psi \in R^{m \times n}$ to the sparse signal vector x.

$$y = \Psi x \qquad \text{[Equation 3]}$$

If x is $x = \Phi c$ with respect to basis $\Phi \in R^{n \times n}$ and $\|c\|_0 \ll n$, x may also be expressed as a sparse vector. In this case, Equation 3 may be expressed as Equation 4 below.

$$y = \Psi \Phi c \qquad \text{[Equation 4]}$$

Here, $\Psi \Phi$ becomes a sensing matrix. If the sensing matrix is represented by A in Equation 3, the sample value for the sparse signal vector x may be expressed as Equation 5 below.

$$y = Ax \qquad \text{[Equation 5]}$$

In general, if m<n, the solution of Equation 3 may not be calculated because the number of unknown variables is greater than the number of measured samples. However, if the condition that the vector x is sparse is known in advance, the solution of Equation 3 may be calculated by solving an optimization problem of Equation 6 below.

$$\bar{x} = \arg \min_{x \in \Re^n} \|x\|_1 \text{ s.t. } y = Ax \qquad \text{[Equation 6]}$$

In Equation 6, applying $l_1$-norm instead of $l_1$-norm is to formalize the problem of Equation 6 to a linear optimization problem. Since Equation 6 is a convex problem, there is a unique solution, but the complexity of $o(n^3)$ is required to find this solution. Various types of algorithms have been studied to solve this complexity.

If $x_i$ is sparse in Equation 2, the symbols may be detected based on Equation 6.

A system model based on Equation 2 that allocates a unique spreading sequence to each user may cause a situation where processing can not be performed if the number of users increases. That is, it is impossible to apply a system model based on Equation 2 in a situation where a large number of MTC devices exist like an IoT application environment. Therefore, in the exemplary embodiment of the present invention, there is disclosed a random access scheme capable of efficiently detecting a user symbol even when the number of MTC devices to be accessed at the same time is large.

Hereinafter, in the exemplary embodiment of the present invention, there is disclosed a transmission and reception structure capable of efficiently detecting user symbols even if the number of user equipments to be connected at the same time is very large (for example, K>1,000). Accordingly, the random access capacity that can be implemented with the same radio resource may be increased.

Hereinafter, a specific channel access method for a plurality of user equipments is disclosed.

In the spreading random access based on compressed sensing, K user equipments may access each base station, and at this time, it is assumed that each user equipment has a symbol to be randomly transmitted at a probability of Pa. Further, it is assumed that M spreading sequences are defined in each base station, and each spreading sequence has a length of M chips. The user equipments to transmit the spreading sequences in a specific symbol interval may randomly select one of $N_s$ spreading sequences and transmit the spreading sequence according to frame synchronization. If the user equipments to transmit the spreading sequence receive a unique spreading sequence in advance by a specific procedure and performs the scheduling therefor, $N_s$ user equipments may simultaneously transmit the spreading sequences based on code division using $N_s$ orthogonal codes.

However, in the exemplary embodiment of the present invention, in order to minimize the problem of the overhead and the delay according to a pre-scheduling procedure, each user equipment may perform the transmission based on a spreading sequence randomly selected without a separate control procedure and a delay. When the spreading sequence is randomly selected, a collision may occur, in which a plurality of user equipments select the same spreading sequence. Thus, the number of selectable spreading sequences needs to be greater than the number of simultaneously accessing user equipments. The collision probability varies according to an activity factor Pa of the user equipment and may be determined by a traffic characteristic of the IoT application service.

In the exemplary embodiment of the present invention, there is disclosed a method of maximizing the capacity of random access channels that can be simultaneously transmitted using a compressed sensing concept when assuming that all the user equipments transmit the random access channel with the same activation probability. In order to maintain the collision probability of transmitting the same spreading sequence below a certain level, generally, it can be assumed that the number of spreading sequences is sufficiently larger than the number of simultaneously transmitted user equipments (i.e., $N_s > M$). Accordingly, the signals transmitted by the user equipments may not maintain orthogonality, and a new signal detection method using the sparsity of the transmission of the user equipment is required.

That is, at a receiving end, information about which any user equipment is activated and information about data transmitted by the user equipment needs to be detected at the same time, and it may be modeled by the concept of the above-described compressed sensing.

If the spreading sequence selected by the k-th user in a spreading sequence set is $s^{(k)} \in R^M$, the i-th data symbol spread and transmitted by the selected spreading sequence may be represented by $d_i^{(k)}$. If the user k is activated, $d_i^{(k)} \in 1, -1$, and if not, $d_i^{(k)} = 0$. A user signal $y_i$ received simultaneously from the base station after being spread by the sequence selected by the activated users may be expressed as Equation 7 below.

$$y_i = \sum_{k=1}^{K} H_k s^{(k)} d_i^{(k)} + \omega_i \qquad \text{[Equation 7]}$$

In Equation 7, $\omega_i$ is an additive Gaussian noise vector, and $H_k$ is a channel matrix of the k-th user and may be expressed by a frequency selective channel having L paths as shown in Equation 8 below.

$$H_k = \begin{bmatrix} h_{k,0} & 0 & \cdots \\ h_{k,1} & h_{k,0} & \\ \vdots & \vdots & \ddots \\ h_{k,L-1} & h_{k,L-2} & \\ 0 & h_{k,L-1} & \\ \vdots & \vdots & \ddots \\ 0 & 0 & \end{bmatrix} \in \mathfrak{R}^{M \times M} \qquad \text{[Equation 8]}$$

A set of users selecting the spreading sequence n is called $u^{(n)}$.

The channel and the spreading effect of Equation 7 are combined to be modeled as one matrix A, and accordingly, Equation 7 may be expressed as Equation 9 below.

$$y_i = A x_i + \omega_i \qquad \text{[Equation 9]}$$

In Equation 9, an n-th element $x_{i,n}$ of $x_i$ is the sum of the symbols of the users selecting spreading sequence n to transmit the i-th symbol, $$x_{i,n} = \sum_{k \in \mathcal{U}^{(n)}} d_i^{(k)}$$

$(n = 1, 2, \ldots, N_s)$.

Figure 2:
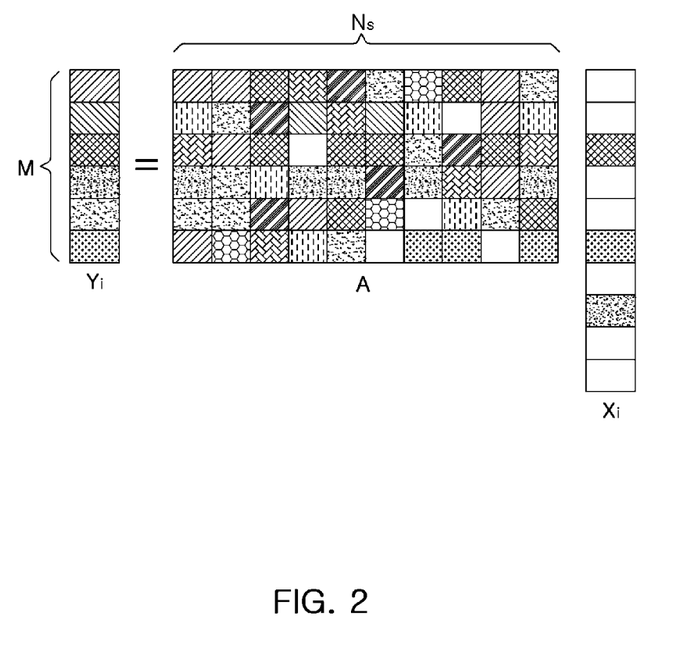
FIG. 2 is a schematic diagram illustrating channel modeling considering both a channel and a spreading effect according to an exemplary embodiment of the present invention.

FIG. 2 is a schematic diagram illustrating channel modeling considering both a channel and a spreading effect according to the exemplary embodiment of the present invention.

In FIG. 2, there is disclosed a matrix A modeled by combining the channel and the spreading effect as shown in Equation 9.

The matrix A may be expressed by Equation 10 below.

$$A = \underbrace{[H_1 \ H_2 \ \cdots \ H_K]}_{H} \underbrace{\begin{bmatrix} s^{(1)} & 0 & \cdots & 0 \\ 0 & s^{(2)} & \cdots & 0 \\ \vdots & \vdots & \ddots & \vdots \\ 0 & 0 & \cdots & s^{(K)} \end{bmatrix}}_{S} \qquad \text{[Equation 10]}$$

If the activation probability of each user is sufficiently low (that is, $P_a \ll 1$), the collision probability according to the spreading sequence selection may be lowered to a certain level or less. On the other hand, assuming $M < N_s$ (i.e., assuming an overloaded CDMA system) to ensure band efficiency, the system modeled in Equation 9 may be an under-determined system.

At this time, since $P_a \ll 1$, the vector $x_i$ has sparsity such that the user and the corresponding data activated by the above-described compressed sensing detection method may be determined at the same time. When a size M of the spreading sequence is fixed, as the more the spreading sequence is generated, the larger the correlation between the columns of the matrix A becomes, and the detection performance may be further deteriorated. Accordingly, the number of usable spreading sequences affects both the collision performance and the detection performance. Therefore, in order to maximize the random access capacity, a design and a detection method capable of maximizing the detection performance considering both of these performances are required.

Hereinafter, there is disclosed a random access scheme based on compressed sensing for a large capacity connection according to the exemplary embodiment of the present invention.

The system model based on Equation 9 applies a spreading scheme for one symbol, but in an actual system, the activated user equipment continuously transmits a plurality of symbols. That is, assuming that a burst of the IoT device having a short length is transmitted to symbols continued in predetermined frame units, the activation of the user may occur by a frame unit other than a symbol unit.

The frame may be constituted by $N_c$ symbols, and users activated in each frame unit may select one of the predetermined spreading sequences and spread and transmit each symbol. Based on the transmission structure by the frame unit, the activation detection performance of the user may be improved. However, if the length of the frame becomes larger, the size of the matrix A disclosed in Equation 9 becomes larger, and the detection complexity may be rapidly increased. Therefore, the actual detection may be performed by a group unit (for example, a subframe unit), in which a frame is divided into appropriate units, rather than a frame unit in order to lower calculation complexity.

When a specific user is activated, one of the $N_s$ spreading sequences is randomly selected, and each symbol included in the group may be spread and transmitted with the selected spreading sequence.

A data symbol sequence to be transmitted by the user selecting the n-th spreading sequence $s^{(n)} \in R^M$ may be expressed by $(d_1^{(n)}, d_2^{(n)}, \ldots, b_{N_c}^{(n)})$. The data symbol sequence may be divided into v unit groups as follows and grouped into $N_g$ groups as $$(\underbrace{d_{1,1}^{(k)}, d_{1,2}^{(k)}, \ldots, d_{1,v}^{(k)}}_{Group\ 1}, \underbrace{d_{2,1}^{(k)}, d_{2,2}^{(k)}, \ldots, d_{2,v}^{(k)}}_{Group\ 2},$$

$$\ldots, \underbrace{d_{N_g,1}^{(k)}, d_{N_g,2}^{(k)}, \ldots, d_{N_g,v}^{(k)}}_{Group\ N_g})$$

(assuming $N_g \cdot v = N_c$). Here, the symbol sequence of the i-th group is represented by $d_i^{(k)}$ (that is, $d_i^{(k)} \triangleq (d_{i,1}^{(k)}, d_{i,2}^{(k)}, \ldots, d_{i,v}^{(k)})$). The user signal $\bar{y}_i$ received simultaneously by the base station in the i-th group may be expressed as Equation 11 below.

$$\bar{y}_i = \sum_{k=1}^{K} H_k S^{(k)} d_i^{(k)} + \bar{\omega}_i, \; i = 1, 2, \ldots, N_g \qquad [\text{Equation 11}]$$

Here, $S^{(k)}$ may be expressed as Equation 12 below by the spreading sequence $s^{(k)}$ selected by the k-th user.

$$S^{(k)} = \begin{pmatrix} s^{(k)} & 0 & \cdots & 0 \\ 0 & s^{(k)} & \cdots & 0 \\ \vdots & \vdots & \ddots & \vdots \\ 0 & 0 & \cdots & s^{(k)} \end{pmatrix} \in \mathfrak{R}^{Mv \times v} \qquad [\text{Equation 12}]$$

The matrix of Equation 12 may mean that the same spreading sequence is applied to all the symbols in the group. Meanwhile, $H_k$ of Equation 12 is defined as Equation 8 as a channel matrix of the k-th user and $H_k \in R^{Mv \times Mv}$.

The channel and the spreading effect in Equation 12 are combined to be modeled as one matrix $\bar{A}$, and accordingly, Equation 12 may be expressed as Equation 13 below.

$$y_i = A \odot x_i + w_i \qquad [\text{Equation 13}]$$

$\odot$ is an operation of $(a+b) \odot (c+d) = ac + bd$.

In Equation 13, A and $x_i$ may be defined as Equation 14 below, respectively.

$$A = \left[ \sum_{k \in K^{(1)}} circ(h_k) S^{(1)} \; \cdots \; \sum_{k \in K^{(N_s)}} circ(h_k) S^{(N_T)} \right] \qquad [\text{Equation 14}]$$

$$x_i = [x_{i,1}, x_{i,2}, \ldots, x_{i,N_T}]^T$$

$$x_{ij} = \sum_{k \in K^{(j)}} d_i^{(k)}$$

In addition, in Equation 14, $\omega_i \in R^{Mv}$ is an additive Gaussian noise vector.

Figure 3:
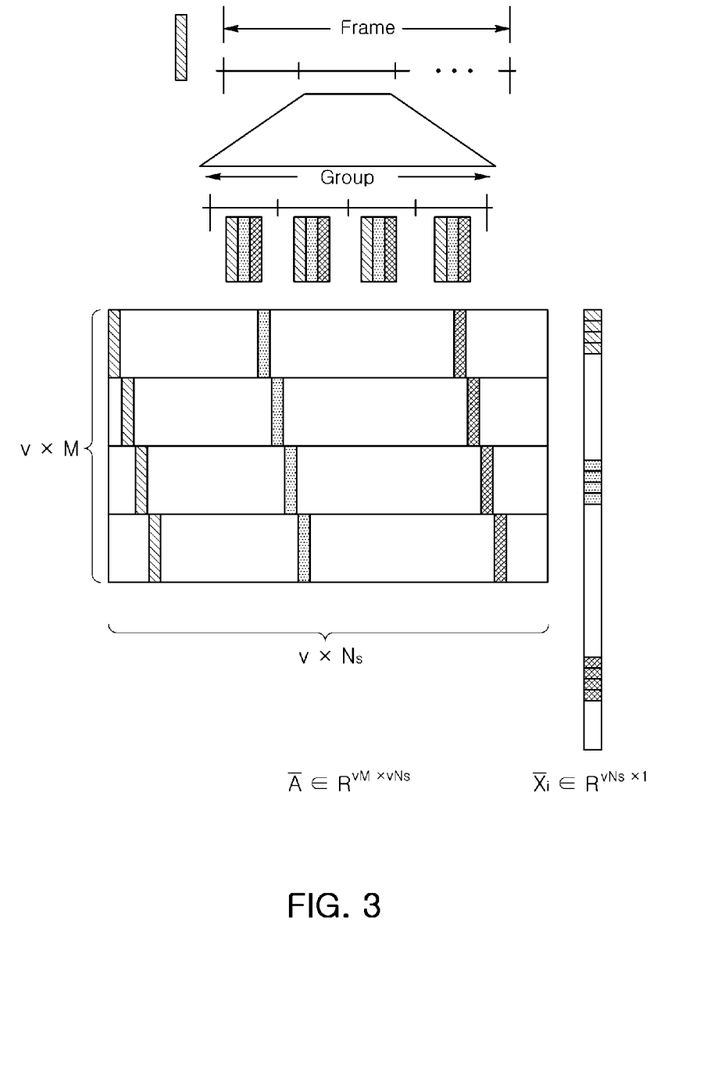
FIG. 3 is a schematic diagram illustrating channel modeling considering both a channel and a spreading effect according to the exemplary embodiment of the present invention.

FIG. 3 is a schematic diagram illustrating channel modeling considering both a channel and a spreading effect according to the exemplary embodiment of the present invention.

In FIG. 3, there is disclosed an operation structure in Equation 13. It is confirmed based on the structure of the matrix $\bar{A}$ that the spreading sequence selected by each user equipment is commonly applied to all the symbols in the same group. As such, a method of accessing a channel by spreading one spreading sequence selected for all the symbols in the same group may be expressed as a single-spreading sequence-based random access (SSRA).

Figure 4:
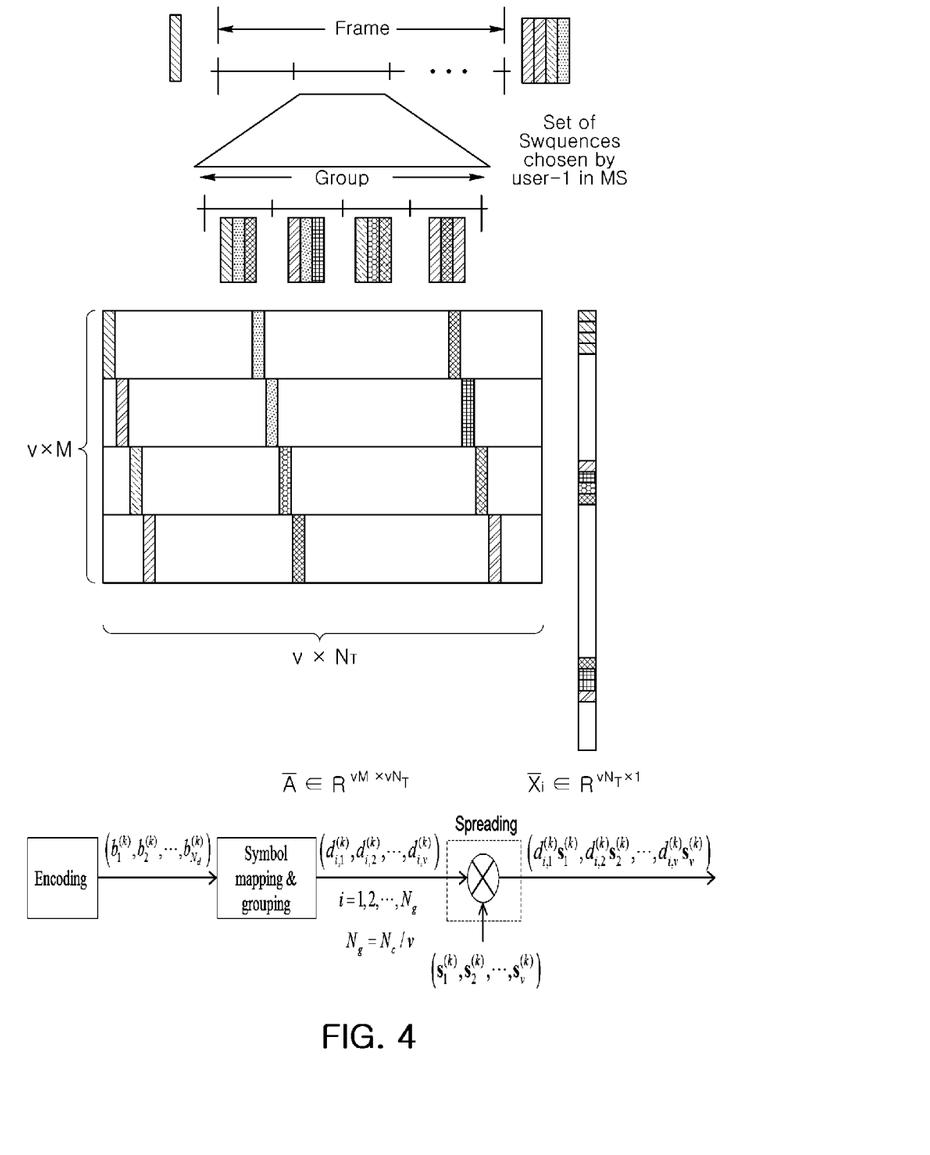
FIG. 4 is a schematic diagram illustrating channel modeling considering both a channel and a spreading effect according to the exemplary embodiment of the present invention.

FIG. 4 is a schematic diagram illustrating channel modeling considering both a channel and a spreading effect according to the exemplary embodiment of the present invention.

In FIG. 4, unlike FIG. 3, there is a method in which an activated user applies a different spreading sequence for each symbol, rather than applying the same spreading sequence to each symbol in the group unlike FIG. 3.

A plurality of spreading sequence sets are defined to apply different spreading sequences to each symbol in the group and each activated user equipment may select one spreading sequence set from a defined spreading sequence set to perform spreading transmission for each group.

Here, a set of $N_T$ spreading sequences is defined, and the set of the $N_T$ spreading sequences may be expressed as $S^{(1)}$, $S^{(2)}, \ldots, S^{(N_T)}$, respectively. A set $S^{(n)}$ of one spreading sequence may be constituted by v spreading sequences, and if the i-th spreading sequence in the set $S^{(n)}$ of spreading sequences is defined as $s_i^{(i)} \in R^M$, $S^{(n)} = s_1^{(n)}, s_2^{(n)}, \ldots, S_v^{(n)}$. In this case, the spreading matrix of Equation 12 may be expressed as Equation 15 below.

$$S^{(n)} = \begin{pmatrix} s_1^{(n)} & 0 & \cdots & 0 \\ 0 & s_2^{(n)} & \cdots & 0 \\ \vdots & \vdots & \ddots & \vdots \\ 0 & 0 & \cdots & s_v^{(n)} \end{pmatrix} \qquad [\text{Equation 15}]$$

As such, the method of performing the channel access by spreading with different spreading sequences with respect to each symbol in the group may be expressed as multi-spreading sequence-based random access (MSRA).

Correlation between sequences is a major cause of detection errors, and since $N_s > M$ or $N_T > M$, serious correlations between sequences may be caused. Accordingly, since the correction between the sequences may be mitigated rather than SSRA through MSRA, a larger capacity of random access may be supported through the MSRA.

Hereinafter, in the exemplary embodiment of the present invention, when the above-described SSRA and MSRA type random access techniques are used, a simulation for comparison of performance detected by a compressed sensing algorithm is specifically disclosed.

The used simulation parameters may be shown in Table 1 below and a PN sequence may be generated as a spreading sequence. The PN sequence may be normalized to have a unit size in order to secure compressed sensing performance. The set of spreading sequences to be selected for each user may be selected and allocated from $N_T$ predetermined spreading sequence sets.

TABLE 1

| Parameter | Value | Parameter | Value |
|---|---|---|---|
| $N_{UE}$ | 128 users | $N_C$ | 104 symbols |
| $N_s$ | 128 sequences | $N_T$ | 1,000 sets |

TABLE 1-continued

| Parameter | Value | Parameter | Value |
|---|---|---|---|
| M | 32 chips | Modulation | BPSK |
| v | 4/8 symbols | Coding | Convolutional (1/3) |
| L | 6 | $I_{max}$ | 3 (iterations) |

Through this simulation, a collision probability $P_c$ generated in the random access procedure and a detection error probability $P_d$ according to the compressed sensing may be determined. Based on the determined collision probability and detection error probability, a reception error probability $P_e$ can be determined as $P_e=1-(1-P_d)(1-P_c)$. On the other hand, a traffic load of an MTC terminal may be designated with an activation probability of a probability $P_a$ that the terminal attempts the random access by each frame unit.

Figure 5:
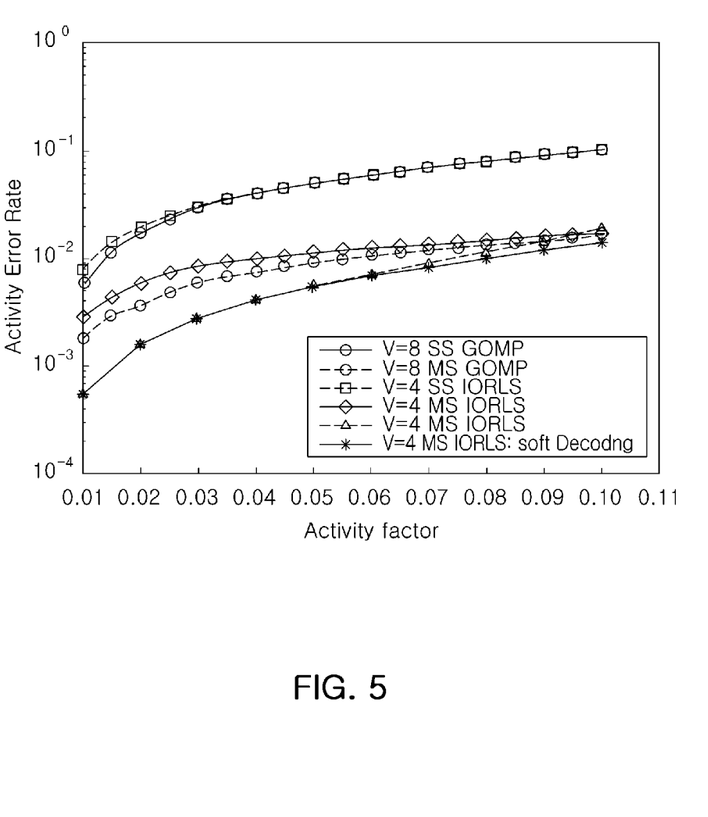
FIG. 5 is a graph illustrating reception error performance according to the exemplary embodiment of the present invention.

FIG. 5 is a graph illustrating reception error performance according to the exemplary embodiment of the present invention.

In FIG. 5, the reception error performance $P_e$ according to the activation probability $P_a$ at different group sizes v may be measured.

Here, the SSRA scheme and the MSRA scheme use the same amount of resources while maintaining the same spreading sequence length, respectively. A group orthogonal matching pursuit (GOMP) algorithm is applied to v=4 and v=8.

Referring to FIG. 5, it can be confirmed that the activity error rate of the MSRA scheme is lower than the activity error rate of the SSRA scheme. That is, the performance of the MSRA scheme may be superior to that of the SSRA scheme.

On the other hand, in the case of the MSRA scheme, it may be confirmed that as the group size may be increased, the performance is improved, but the performance gain is insignificant. In addition, it is confirmed that the performance may be further improved by detection based on iterative order recursive least square (IORLS) estimation.

Figure 6:
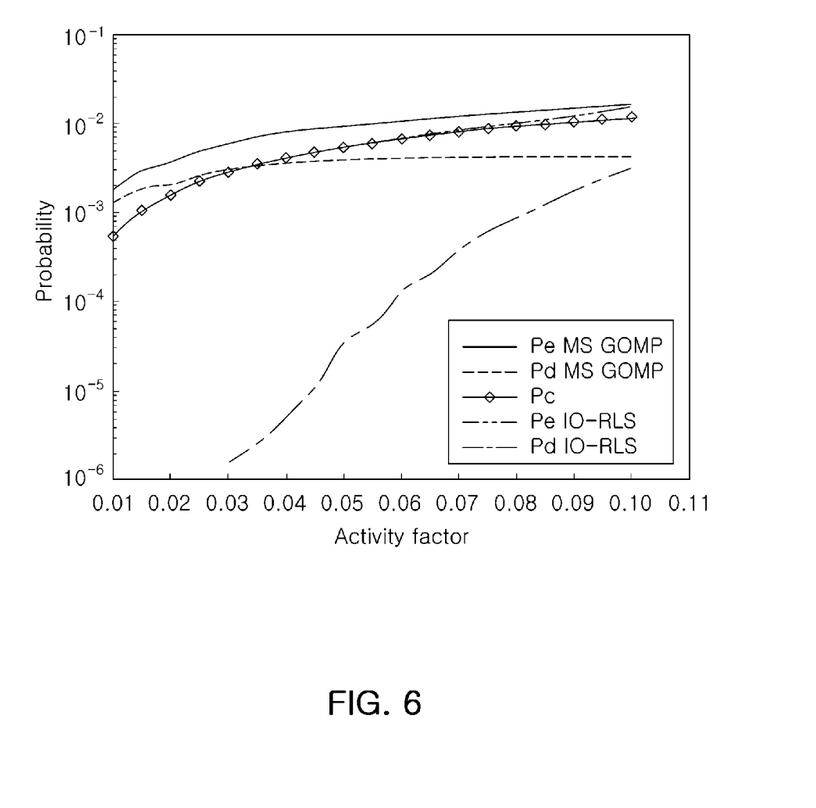
FIG. 6 is a graph illustrating reception error performance according to the exemplary embodiment of the present invention.

FIG. 6 is a graph illustrating reception error performance according to the exemplary embodiment of the present invention.

In FIG. 6, in addition to the collision probability $P_c$ and the detection error probability $P_d$, the total reception error performance $P_e$ according to each performance is disclosed.

Referring to FIG. 6, it can be confirmed that the detection error performance is more dominantly affected than the collision probability when $P_a<0.35$. Here, as shown in FIG. 4, it can be confirmed that the IORLS-based detection is much superior to the GOMP algorithm. Generally, as the total number of spreading sequence sets increases, the collision error rate decreases, but the detection error rate decreases because the correlation between the sequence sets increases. The total reception error performance is maximized from an activation probability value at a point where the collision error rate and the detection error rate become equal to each other, and it is meant that the maximum performance may be maintained by controlling the activation probability.

In the case of the SSRA and the MSRA, packet transmission is performed without a separate reservation request procedure, and it is assumed that random access is successful only when a unique identifier of each received terminal is detected. Here, it is assumed that the size of the unique identifier has a size of 2 bytes for each user. That is, it can be seen that if the collision is not generated in the preamble selection and a 2-byte identifier is detected, the random access is successful. Here, for the purpose of performance comparison, it is assumed that an LTE scheme attempts to request a reservation with 32 preambles, and a random access is successful if no collision occurs in this process. The probability that the random access is not successful is called outrage rate.

Figure 7:
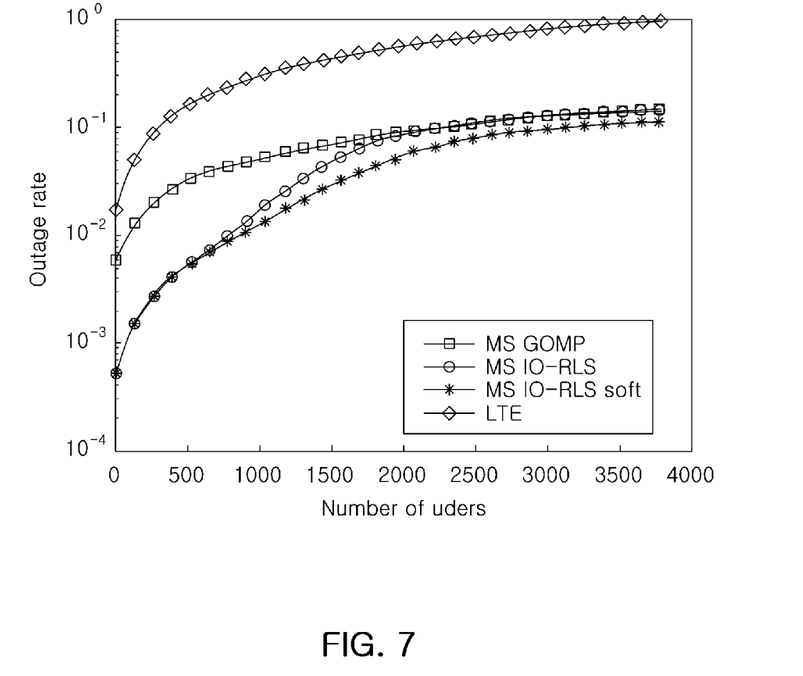
FIG. 7 is a graph illustrating outrage rate of each scheme according to the exemplary embodiment of the present invention.

FIG. 7 is a graph illustrating outrage rate of each scheme according to the exemplary embodiment of the present invention.

The capacity of the random access channel may be compared based on the outrage rate.

Referring to FIG. 7, it can be seen that the performance of the MSRA is better than that of the SSRA. For example, if the target reception error performance is $P_e=0.01$, it can be estimated that about ten times as many users as the LTE can be transmitted simultaneously by the detection of the IORLS scheme.

Figure 8:
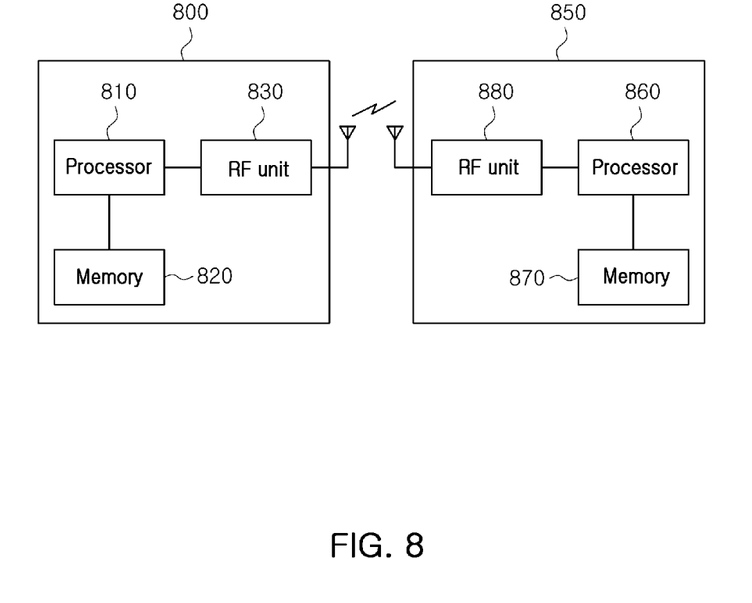
FIG. 8 is a block diagram illustrating a wireless device to which the exemplary embodiment of the present invention is applicable.

FIG. 8 is a block diagram illustrating a wireless device to which the exemplary embodiment of the present invention is applicable.

Referring to FIG. 8, a transmitter 800 includes a processor 810, a memory 820, and a radio frequency (RF) unit 830.

The RF unit 830 may be connected with the processor 810 to transmit/receive a wireless signal.

The processor 810 may implement the functions, processes, and/or methods proposed in the present invention. For example, the processor 810 may be implemented to perform operations of the transmitter (e.g., user equipment) according to the exemplary embodiment of the present invention described above. The processor may perform the operations of the transmitter described in the exemplary embodiment of FIGS. 1 to 7.

For example, the processor 810 may be implemented to select one spreading sequence set from a plurality of spreading sequence sets without a separate resource allocation and/or spreading sequence allocation, apply each of the plurality of spreading sequences included in one spreading sequence set to each of the plurality of symbols included in a group, and transmit each of the plurality of symbols spread based on each of the plurality of spreading sequences.

Alternatively, the processor 810 may be implemented to select one spreading sequence from the plurality of spreading sequences, apply one spreading sequence to each of the plurality of symbols included in the group, and transmit each of the plurality of spreading symbols based on one spreading sequence.

The group is generated by grouping a plurality of symbols included in a data symbol sequence into v unit symbols, and one spreading sequence to be applied in a group unit may be determined.

A receiver 850 includes a processor 860, a memory 870, and a radio frequency (RF) unit 880.

The RF unit 880 may be connected with the processor 860 to transmit/receive a wireless signal.

The processor 860 may implement the functions, processes, and/or methods proposed in the present invention. For example, the processor 860 may be implemented to perform operations of the receiver (e.g., a base station receiving a signal of user equipment) according to the exemplary embodiment of the present invention described above. The processor may perform the operations of the receiver described in the exemplary embodiment of FIGS. 1 to 7.

For example, the processor 860 may be implemented to receive a plurality of symbols spread from the user equipment and decode the symbols received based on a spreading sequence.

The processors 810 and 860 may include application-specific integrated circuits (ASICs), other chipsets, logic circuits, data processing devices, and/or converters mutually converting baseband signals and wireless signals. The memories 820 and 870 may include a read-only memory (ROM), a random access memory (RAM), a flash memory, a memory card, storage media and/or other storage devices. The RF units 830 and 880 may include one or more antennas transmitting and/or receiving the wireless signals.

When the exemplary embodiment is implemented by software, the above-described techniques may be implemented with modules (processes, functions, and the like) that perform the functions described above. The modules may be stored in the memories 820 and 870 and executed by the processors 810 and 860. The memories 820 and 870 may be inside or outside the processors 810 and 860 and may be connected to the processors 810 and 860 in various well known means.

The method for detecting the random access and the multi-user using the multiple sequence spreading may be implemented by applications or implemented in the form of program instructions that can be executed through various computer components to be recorded in a computer-readable recording medium. The computer readable recording medium may include one or a combination of a program command, a data file, and a data structure.

The program command recorded on the computer readable recording medium may be specially designed and configured for the present invention, or may be publicly known to and used by those skilled in the computer software field.

An example of the computer readable recording medium includes a magnetic media such as a hard disk, a floppy disk, and a magnetic tape, an optical media such as a CD-ROM and a DVD, a magneto-optical media such as a floptical disk, and a hardware device, such as a ROM, a RAM, and a flash memory, which is specially configured to store and execute a program command.

An example of the program command includes a high-level language code executable by a computer by using an interpreter and the like, as well as a machine language code created by a compiler. The hardware device may be configured to be operated with one or more software modules in order to perform the operation of the present invention, and an opposite situation thereof is available.

As described above, although the present invention has been described with reference to the exemplary embodiments, it will be understood to those skilled in the art that the present invention can be variously corrected and modified without departing from the spirit and the scope of the present invention as disclosed in appending claims.

What is claimed is:

1. A method for detecting real-time random access and multi-user using multiple sequence spreading, the method comprising steps of:

selecting, by a user equipment, one spreading sequence set from a plurality of spreading sequence sets randomly without a separate resource allocation and/or spreading sequence allocation;

applying, by the user equipment, each of the plurality of spreading sequences included in the one spreading sequence set to each of a plurality of symbols included in a group; and transmitting, by the user equipment, each of the plurality of symbols spread based on each of the plurality of spreading sequences, wherein the base station receives the plurality of spread symbols, and the plurality of spread symbols received from the base station is expressed by Equation below, $$y_i = A \odot x_i + \omega_i \qquad \text{[Equation]}$$

here, $y_i$ represents the plurality of spread symbols received from the base station, A represents a channel matrix, $x_i$ represents the plurality of spread symbols, $\omega_i$ represents a noise vector, and $\odot$ is an operation of $(a+b) \odot (c+d) = ac + bd$, the channel matrix is determined based on a spreading matrix based on each of the plurality of spreading sequences below, $$S^{(n)} = \begin{pmatrix} s_1^{(n)} & 0 & \cdots & 0 \\ 0 & s_2^{(n)} & \cdots & 0 \\ \vdots & \vdots & \ddots & \vdots \\ 0 & 0 & \cdots & s_v^{(n)} \end{pmatrix}$$

here, $s_l^{(n)}$ represents the l-th spreading sequence included in the n-th spreading sequence set and $s_1^{(n)} \neq s_2^{(n)} \neq \cdots \neq s_l^{(n)} \neq \cdots \neq s_v^{(n)}$, the group is generated by grouping a plurality of symbols included in a data symbol sequence into v unit symbols, and one spreading sequence set of a plurality of spreading sequence sets to be applied by a unit of the group is determined.

2. An apparatus for detecting real-time random access and multi-user using multiple sequence spreading, the apparatus comprising:

a radio frequency (RF) unit transmitting and receiving a wireless signal; and a processor operatively coupled with the RF unit, wherein the processor selects one spreading sequence set from a plurality of spreading sequence sets randomly without a separate resource allocation and/or spreading sequence allocation, applies each of the plurality of spreading sequences included in the one spreading sequence set to each of a plurality of symbols included in a group, and transmits each of the plurality of symbols spread based on each of the plurality of spreading sequences, wherein the base station receives the plurality of spread symbols, and the plurality of spread symbols received from the base station is expressed by Equation below, $$y_i = A \odot x_i + \omega_i \qquad \text{[Equation]}$$

here, $y_i$ represents the plurality of spread symbols received from the base station, A represents a channel matrix, $x_i$ represents the plurality of spread symbols, $\omega_i$ represents a noise vector, and $\odot$ is an operation of $(a+b) \odot (c+d) = ac + bd$, the channel matrix is determined based on a spreading matrix based on each of the plurality of spreading sequences below, $$S^{(n)} = \begin{pmatrix} s_1^{(n)} & 0 & \cdots & 0 \\ 0 & s_2^{(n)} & \cdots & 0 \\ \vdots & \vdots & \ddots & \vdots \\ 0 & 0 & \cdots & s_v^{(n)} \end{pmatrix}$$

here, $s_l^{(n)}$ represents the l-th spreading sequence included in the n-th spreading sequence set and $s_1^{(n)} \neq s_2^{(n)} \neq \ldots \neq s_l^{(n)} \neq \ldots \neq s_v^{(n)}$, the group is generated by grouping a plurality of symbols included in a data symbol sequence into v unit symbols, and one spreading sequence set of a plurality of spreading sequence sets to be applied by a unit of the group is determined.

* * * * *